(12) United States Patent
Gassmann et al.

(10) Patent No.: US 10,688,858 B2
(45) Date of Patent: Jun. 23, 2020

(54) HYBRID VEHICLE TRANSMISSION ASSEMBLY AND DRIVE SYSTEM

(71) Applicant: GKN Automotive Ltd., Redditch, Worcestershire (GB)

(72) Inventors: Theodor Gassmann, Siegburg (DE); Jan Haupt, Kürten (DE); Moritz Abbenhaus, Troisdorf (DE); Sven Herber, Hürth (DE); Wolfgang Hildebrandt, Siegburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days.

(21) Appl. No.: 16/318,390

(22) PCT Filed: Nov. 4, 2016

(86) PCT No.: PCT/EP2016/076703
§ 371 (c)(1),
(2) Date: Jan. 17, 2019

(87) PCT Pub. No.: WO2018/014983
PCT Pub. Date: Jan. 25, 2018

(65) Prior Publication Data
US 2019/0225070 A1    Jul. 25, 2019

(30) Foreign Application Priority Data
Jul. 22, 2016 (WO) ................ PCT/EP2016/067483

(51) Int. Cl.
*B60K 6/543*    (2007.10)
*B60K 6/365*    (2007.10)
(Continued)

(52) U.S. Cl.
CPC ............ *B60K 6/365* (2013.01); *B60K 6/48* (2013.01); *B60K 6/543* (2013.01); *B60K 6/547* (2013.01);
(Continued)

(58) Field of Classification Search
None
See application file for complete search history.

(56) References Cited

U.S. PATENT DOCUMENTS 5,525,116 A    6/1996   Ra et al.
8,602,938 B1   12/2013  Blohm et al.
(Continued)

FOREIGN PATENT DOCUMENTS

DE    10 2007 018999 A1    10/2008
DE    10 2011 014 703 A1    11/2011
(Continued)

OTHER PUBLICATIONS

International Search Report and Written Opinion for PCT/EP2016/076703 dated Mar. 22, 2017 (13 pages; with English translation).
Office Action of the Japanese Patent Office dated Jan. 21, 2020 for application No. 2019-503351 (English translation only).

*Primary Examiner* — Justin Holmes
(74) *Attorney, Agent, or Firm* — Bejin Bieneman PLC

(57) ABSTRACT

A transmission arrangement for a hybrid vehicle has an internal combustion engine and an electric machine. A first drive torque of the internal combustion engine and a second drive torque of the electric machine are transmissible to at least one drive shaft of the hybrid vehicle by the transmission arrangement. The transmission arrangement comprises a first planetary transmission with first components including a first sun gear, first ring gear and first planet carrier. A third drive torque is transmissible to a second planet carrier of a second planetary transmission by the first planet carrier. The second planetary transmission has second components (Continued)

including a second planet carrier, second sun gear and third sun gear. The second sun gear meshes with a first toothing of a second planet gear. The third sun gear meshes with a second toothing of the second planet gear. A drive shaft of the hybrid vehicle is driveable by the third sun gear.

16 Claims, 10 Drawing Sheets

(51) Int. Cl.
*B60K 6/48* (2007.10)
*F16H 3/72* (2006.01)
*B60K 6/547* (2007.10)

(52) U.S. Cl.
CPC .............. *F16H 3/725* (2013.01); *F16H 3/728* (2013.01); *B60K 2006/4816* (2013.01); *F16H 2200/2007* (2013.01); *F16H 2200/2041* (2013.01); *Y02T 10/6221* (2013.01); *Y02T 10/6256* (2013.01)

(56) References Cited

U.S. PATENT DOCUMENTS

| 2002/0094898 | A1* | 7/2002 | Hata | B60L 58/40 |
| | | | | 475/5 |
| 2007/0105678 | A1 | 5/2007 | Bucknor et al. | |
| 2013/0260939 | A1 | 10/2013 | Bomtraeger et al. | |
| 2016/0238110 | A1* | 8/2016 | Morrow | B60K 6/387 |
| 2017/0327122 | A1* | 11/2017 | Ishida | B60K 6/547 |
| 2017/0334280 | A1* | 11/2017 | Lecomte | B60K 6/365 |
| 2018/0154758 | A1* | 6/2018 | Lee | B60K 6/445 |

FOREIGN PATENT DOCUMENTS

| DE | 10 2010 063 311 A1 | 6/2012 |
| DE | 11 2012 006555 T5 | 3/2015 |
| EP | 2810839 A1 | 12/2014 |
| FR | 2961753 A1 | 12/2011 |
| JP | S59-136330 U | 9/1984 |
| JP | H05-332408 A | 12/1993 |
| JP | 2006117084 A | 5/2006 |

* cited by examiner

HYBRID VEHICLE TRANSMISSION ASSEMBLY AND DRIVE SYSTEM

CROSS-REFERENCE TO RELATED APPLICATIONS

This application is a national stage of, and claims priority to, Patent Cooperation Treaty Application No. PCT/EP2016/076703, filed on Nov. 4, 2016, which application claims priority to Patent Cooperation Treaty Application No. PCT/EP2016/067483, filed on Jul. 22, 2016, which applications are hereby incorporated herein by reference in their entireties.

BACKGROUND

DE 10 2011 014 703 A1 has disclosed a drive device for a motor vehicle, wherein, by means of a transmission, both an internal combustion engine and an electric motor can be used for driving the motor vehicle. Here, the transmission is a planetary transmission with ring gear, sun gear and a planet carrier, wherein a torque of the internal combustion engine can be introduced into the planetary transmission via the ring gear. A torque of the electric motor can be introduced into the planetary transmission via the sun gear. Drive is output via the planet carrier.

DE 10 2010 063 311 A1 has disclosed a device for a drivetrain of a hybrid vehicle. The device comprises a planetary transmission with the elements ring gear, sun gear and carrier (planet carrier), wherein here, an electric machine introduces a torque into the planetary transmission via the ring gear, and an internal combustion engine introduces a torque into the planetary transmission via the sun gear. Drive is output to a transmission via the carrier.

For such drive devices for hybrid vehicles, in which it is the intention for the motor vehicle to be driven by means of an internal combustion engine and/or an electric machine, there is a constant demand to provide a transmission arrangement which is as compact as possible and configured for all operating points.

SUMMARY

The present disclosure relates to a transmission arrangement for a hybrid vehicle having an internal combustion engine and an electric machine. The transmission arrangement serves for selectively transmitting a drive torque of the electric machine and/or of the internal combustion engine to a drive shaft of the hybrid vehicle. The drive shaft of the hybrid vehicle is arranged between the transmission arrangement and the wheels of the hybrid vehicle. Disclosed herein is a compact transmission arrangement for a hybrid vehicle which comprises firstly a summing transmission for selectively introducing a drive torque of the electric machine and/or of an internal combustion engine and secondly a shift transmission for setting a transmission ratio, wherein the drive torques of electric machine and/or internal combustion engine are transmitted to a drive shaft of the hybrid vehicle by means of the transmission arrangement.

This is addressed by means of a transmission arrangement according to the features of claim 1. The dependent claims relate to advantageous embodiments. The features specified individually in the patent claims may be combined with one another in a technologically expedient manner and may be supplemented by explanatory facts from the description and details from the figures, with further embodiments of the invention being highlighted.

A transmission arrangement for a hybrid vehicle having an internal combustion engine and an electric machine is disclosed, wherein a first drive torque of the internal combustion engine and a second drive torque of the electric machine are transmissible to at least one drive shaft of the hybrid vehicle by means of the transmission arrangement, wherein the transmission arrangement comprises a first planetary transmission with first components including a first sun gear, first ring gear and first planet carrier, wherein a third drive torque is transmissible to a second planet carrier of a second planetary transmission by means of the first planet carrier, wherein the second planetary transmission has second components including a second planet carrier, second sun gear and third sun gear, wherein the second sun gear meshes with a first toothing of a second planet gear and the third sun gear meshes with a second toothing of the second planet gear, wherein a drive shaft of the hybrid vehicle is driveable by means of the third sun gear.

The drive torques are transmitted by means of intermeshing toothings of the individual toothed gears of the transmission arrangement. The third drive torque is the first drive torque, the second drive torque, or a sum of first and second drive torque. Here, the second drive torque may also be negative, specifically if the electric machine is operated as a generator or in an opposite direction of rotation, wherein the first drive torque generated by the internal combustion engine is then correspondingly reduced.

The combination of two planetary transmissions permits a compact structural form and in particular an advantageous setting of the transmission ratios. In particular, coupling of internal combustion engine and electric machine is made possible by means of the first planetary transmission. It is thus possible for a first drive torque of the internal combustion engine, a second drive torque of the electric machine or both drive torques together to be transmitted selectively to the second planetary transmission. Furthermore, a first drive torque of the internal combustion engine may at least partially, by means of the electric machine operated as a generator, be converted into electrical energy and stored for example in an accumulator of the hybrid vehicle. Furthermore, by means of the first planetary transmission, the internal combustion engine can be operated at an optimum operating point with regard to consumption, wherein changes of the third drive torque, or of a rotational speed of the drive shaft, desired by a driver can be set by means of the electric machine.

A transmission ratio of the rotational speed predefined by the first planetary transmission and of the transmitted third drive torque is realized by means of the second planetary transmission. Here, a two-gear ratio shift configuration is realized, that is to say it is possible for two different transmission ratios between the first planetary transmission and the drive shaft to be provided by means of the second planetary transmission.

The two planetary transmissions are in particular constructed independently of one another, that is to say the third drive torque is transmitted between the first planetary transmission and second planetary transmission via two components which have respectively intermeshing toothings, wherein the first component is assigned to the first planetary transmission and the second component is assigned to the second planetary transmission.

In another embodiment, the third drive torque is transmitted between the first planetary transmission and second planetary transmission via a rigid connection. Here, the first planet carrier is also designed as second planet carrier. The first planet carrier thus bears the shafts of the first planet gears and the shafts of the second planet gears.

The internal combustion engine preferably introduces the first drive torque into the first planetary transmission via the first ring gear.

In particular, the electric machine (then) introduces the second drive torque into the first planetary transmission via the first sun gear.

An interchanged arrangement (first drive torque via the first sun gear, second drive torque via the first ring gear) is also possible.

The internal combustion engine is connectable via a first clutch to the first ring gear. The first clutch is in particular arranged outside a housing of the transmission arrangement. In particular, the first clutch is a friction clutch, which can be used for coupling an internal combustion engine and a transmission in the usual manner in known motor vehicles.

In particular, during purely electric operation (third drive torque is provided exclusively by means of the electric machine), the internal combustion engine is decoupled, that is to say the first clutch is then open. In all other operating modes (third drive torque is provided by means of electric machine and internal combustion engine, or by internal combustion engine alone), the internal combustion engine is coupled, that is to say the first clutch is closed.

The first ring gear is in particular connectable rotationally conjointly to a housing of the transmission arrangement by means of a second clutch.

Connectable rotationally conjointly means in particular that, after the connection, the two components have an identical rotational speed. Here, the first ring gear is thus fixed to the (non-rotating) housing of the transmission arrangement.

During purely electric operation (third drive torque is provided exclusively by means of the electric machine), the second clutch is closed, that is to say the first ring gear is fixed to the housing. In all other operating modes (third drive torque is provided by means of electric machine and internal combustion engine, or by internal combustion engine alone), the second clutch is open, that is to say the first ring gear is rotatable relative to the housing.

If the first ring gear is fixed to the housing, the first planet carrier is driven by means of the first sun gear, which meshes with the toothings of the first planet gears arranged on the first planet carrier. The first planet carrier drives the second planet carrier of the second planetary transmission by means of the intermeshing toothings.

In particular, the second clutch is provided only if the first drive torque is introduced via the first ring gear and the second drive torque is introduced via the first sun gear into the first planetary transmission.

In a further embodiment, the first drive torque (of the internal combustion engine) is introduced via the first sun gear and the second drive torque (of the electric machine) is introduced via the first ring gear into the first planetary transmission. In this embodiment, it is preferable for no second clutch to be provided.

In this embodiment, for purely electric operation (third drive torque is provided exclusively by means of the electric machine), the first clutch is open and the third clutch is closed. The function of the second clutch required in the other embodiments is not required here.

In particular, at least two components of the first planetary transmission are connectable rotationally conjointly to one another by means of a third clutch. In particular, it is thus for example the case that the first sun gear is connectable rotationally conjointly to the first ring gear or the first sun gear is connectable rotationally conjointly to the first planet carrier. It is preferable for the first planet carrier to be connectable rotationally conjointly to the first ring gear.

In particular, the third clutch may (preferably, if the second drive torque is introduced into the first planetary transmission via the first ring gear) be a clutch with positively locking action, for example a dog clutch.

In particular, the second sun gear is connectable rotationally conjointly to a housing of the transmission arrangement by means of a fourth clutch. Here, the second sun gear is thus fixed to the (non-rotating) housing of the transmission arrangement.

The fourth clutch is actuated in order to set a desired transmission ratio. When the fourth clutch is open, the second sun gear is rotatable relative to the housing.

In particular, at least two components of the second planetary transmission are connectable rotationally conjointly to one another by means of a fifth clutch. In particular, it is thus for example the case that the second sun gear is connectable rotationally conjointly to the second planet carrier or the third sun gear is connectable rotationally conjointly to the second sun gear. It is preferable for the third sun gear to be connectable rotationally conjointly to the second planet carrier. It is also preferable for the second sun gear to be connectable rotationally conjointly to the second planet carrier.

In particular, the fourth clutch and the fifth clutch are actuated in order to set a desired transmission ratio.

In particular, for a first transmission ratio, the fourth clutch is closed and the fifth clutch is opened. In this case, the third drive torque is transmitted via the second planet carrier, and the second planet gears arranged on the second planet carrier, to the third sun gear, which meshes with a second toothing of the second planet gears.

In particular, for a second transmission ratio, the fourth clutch is opened and the fifth clutch is closed. In this case, the third drive torque is transmitted via the second planet carrier (directly) to the third sun gear or to the shaft which has the third sun gear.

In particular, the third sun gear is driveable by the third drive torque wherein the third drive torque is providable
  a) by the internal combustion engine alone; or
  b) by the electric machine alone; or
  c) by the internal combustion engine and electric machine.

In particular, the first planetary transmission and the second planetary transmission are arranged
  a) adjacent to one another; or
  b) one behind the other along an axial direction; or
  c) one behind the other along an axial direction with a coaxial arrangement of first planet carrier and second planet carrier.

The stated clutches (first clutch to fifth clutch) may be hydraulically, electromechanically, or electrically actuated. In particular, the clutches are friction clutches, for example as multiplate clutches, which in particular have non-positively locking action. In particular, the clutches may also be clutches with positively locking action (for example a dog clutch). For positively locking clutches, it is in particular the case that a synchronization of the rotational speeds of the components to be connected is required. This synchronization may be realized through control of the electric machine.

Positively locking connections are realized by means of the engagement of at least two connecting partners into one another. In this way, the connecting partners cannot be released from one another even in the absence of a transmission of power or when a transmission of power is interrupted. In other words, in the case of a positively locking connection, one of the connecting partners stands in the way of the other.

Non-positively locking connections necessitate a normal force on the surfaces to be connected to one another. The displacement of said surfaces relative to one another is prevented as long as the opposing force effected by the static friction is not exceeded.

According to a further aspect, a drive system having an internal combustion engine and an electric machine and having a transmission arrangement described here is disclosed.

The internal combustion engine preferably introduces the first drive torque into the first planetary transmission via the first ring gear.

In particular, the electric machine (then) introduces the second drive torque into the first planetary transmission via the first sun gear.

An interchanged arrangement (first drive torque via the first sun gear, second drive torque via the first ring gear) is also possible.

In this case, the drive system has an internal combustion engine, an electric machine and a transmission arrangement (as disclosed above) (in particular without the second clutch), wherein the internal combustion engine introduces the first drive torque into the first planetary transmission via the first sun gear, and wherein the electric machine introduces the second drive torque into the first planetary transmission via the first ring gear.

In particular, the internal combustion engine is connectable to the first sun gear by means of a first clutch and at least two components of the first planetary transmission from the group: first sun gear, first ring gear and first planet carrier are connectable rotationally conjointly to one another by means of a third clutch; wherein components of the first planetary transmission are connectable to further components of the drive system exclusively by means of the first clutch and the third clutch (that is to say without the second clutch). In this embodiment, it is thus the case that only the first, third, fourth and fifth clutch are provided.

Here, where a "connection" can be produced in conjunction with a clutch, this means in particular that the clutch can couple the components assigned thereto to one another and/or decouple said components. In other words, this means in particular that the clutch can realize and/or sever operative engagement with regard to the assigned components.

The electric machine can be operable as a generator, wherein a first drive torque of the internal combustion engine, at least partially, or a fourth drive torque of the drive shaft can be converted by means of the generator into electrical energy.

In particular, the electric machine is arranged at a first side and the internal combustion engine is arranged at an opposite, second side of the transmission arrangement. In particular, at least the first planetary transmission is thus arranged along an axial direction between the electric machine and internal combustion engine.

According to a further aspect, a hybrid vehicle having an internal combustion engine and an electric machine and having a transmission arrangement described here is disclosed, wherein the electric machine is operable as a generator for charging an accumulator for electrical energy and as an electric motor for driving a drive shaft of the hybrid vehicle.

The transmission arrangement constitutes a recuperation-capable multi-mode transmission which is operable in a two gear ratio CVT (continuously variable transmission) operating method (electric machine also operable as a generator; internal combustion engine provides first drive torque, electric machine provides second drive torque), a two gear ratio internal combustion engine operating method (ICE; third drive torque corresponds to first drive torque), a two gear ratio electric motor operating method (EM; third drive torque corresponds to second drive torque) and in a two gear ratio parallel operating method (third drive torque is made up of first drive torque and second drive torque). In the CVT operating method, an electrical accumulator, for example an accumulator of the hybrid vehicle, can be charged during driving operation of the hybrid vehicle without an additional generator.

In the CVT operating method, the internal combustion engine is, in low and medium speed ranges, supported on the electric machine and thus operates the latter as a generator. At relatively high speeds, the electric machine is then in particular fed from the accumulator of the hybrid vehicle, and supports the internal combustion engine by virtue of the first drive torque and the second drive torque being added together to form the third drive torque. In combination with the two gear ratio capability provided by the second planetary transmission, it is possible to realize very low fuel consumption levels but also high traction powers and speeds.

In the CVT operating method, a rotational speed of the first planet carrier (and thus the rotational speed of the second planet carrier and that of the drive shaft) can be varied by means of the operation of the electric machine (direction of rotation, rotational speed, second drive torque). In this way, in a particular rotational speed range of the drive shaft, the internal combustion engine can be operated at an optimum operating point (for consumption), wherein the demanded rotational speed and possibly additionally the demanded third drive torque are set or provided by the electric machine.

The shift states of the individual clutches (first clutch to fifth clutch) are equal for the ICE and parallel operating methods. This applies in particular also to the embodiment of the drive system in which the second drive torque is introduced into the first planetary transmission via the first ring gear and in which a second clutch is not provided.

In the internal combustion engine operating method, the provided transmission ratios (gear ratios) are configured in particular both for the demands with regard to the attainable maximum speed and also with regard to minimum fuel consumption.

In the electric motor operating method, the provided transmission ratios (gear ratios) provide in particular both the levels of traction power required for launching and also the desired attainable electric maximum speed (for example 130 km/h [kilometres per hour] in the WLTP (Worldwide Harmonized Light-Duty Vehicles Test Procedure) driving cycle with simultaneously high efficiency.

Below, for a preferred embodiment of the transmission arrangement, the shift states of the individual clutches for the respective operating method and the respective transmission ratio (selection of a gear ratio) will be specified (here, in particular, the first drive torque is introduced via the first ring gear and the second drive torque is introduced via the first sun gear into the first planetary transmission):

|  | CVT 1st trans. | CVT 2nd trans. | ICE 1st trans. | ICE 2nd trans. | EM 1st trans. | EM 2nd trans. |
|---|---|---|---|---|---|---|
| 1st clutch | closed | closed | closed | closed | open | open |
| 2nd clutch | open | open | open | open | closed | closed |
| 3rd clutch | open | open | closed | closed | open | open |
| 4th clutch | closed | open | closed | open | closed | open |
| 5th clutch | open | closed | open | closed | open | closed |

CVT: CVT operating method and parallel operation
ICE: internal combustion engine operation
EM: electric motor operation
Xth trans.: Xth transmission ratio (first or second); that is to say Xth gear ratio (first or second gear ratio)
Xth clutch: shift state of each clutch
open: clutch open; components connectable by clutch rotate independently of one another
closed: clutch closed; components connected by clutch are connected rotationally conjointly to one another In particular, the following transmission ratios are disclosed, which can apply for the first ring gear being connected to the internal combustion engine and the first sun gear being connected to the electric machine:

1. Fixed-carrier transmission ratio in the first planetary transmission, corresponds to the ratio of rotational speed of first sun gear to rotational speed of first ring gear or to the diameter of first ring gear to diameter of first sun gear; negative sign, because resultant directions of rotation of first ring gear and first sun gear when the first planet carrier is stationary are opposite: −1.5 to −5; e.g., 2.0 to 3.0; preferably 2.1 to 2.3.
2. Step between the relatively low first transmission ratio and the relatively high second transmission ratio: 1 to 3; e.g., 1.5 to 2.5; preferably 2.
3. Preliminary transmission ratio for introduction of first drive torque of the internal combustion engine into the first planetary transmission, for example to the first ring gear; and preliminary transmission ratio for introduction of second drive torque of the electric machine into the first planetary transmission, for example to the first sun gear: 0.5 to 1.5; e.g., 0.8 to 1.2; preferably 1 (no transmission ratio).
4. Overall transmission ratio of the transmission arrangement; wherein
   a. as launch transmission ratio (wheel slip limit or launching on a kerb: between 14 and 23;
   b. as transmission ratio for the highest gear ratio (depending on demanded maximum speed and in order to achieve the lowest possible consumption: between 2 and 7.
5. Overall transmission ratio of the transmission arrangement:
   a. Drive by means of electric machine alone:
      i. 1st transmission ratio (1st gear ratio): between 20 and 23; e.g., 21.5 to 22;
      ii. 2nd transmission ratio (2nd gear ratio): between 9 and 12; e.g., 10.5 to 11;
   b. Drive by means of internal combustion engine alone:
      i. 1st transmission ratio (1st gear ratio): between 6 and 8; e.g., 6.5 to 7;
      ii. 2nd transmission ratio (2nd gear ratio): between 2 and 4; e.g., 3 and 3.5.

If the electric machine is connected via the first ring gear and the internal combustion engine is connected via the first sun gear to the first planetary transmission, the transmission arrangement may also be used without the second clutch. Below, shift states of the individual clutches (second clutch not present) for the respective operating method and the respective transmission ratio (selection of a gear ratio) will be specified:

|  | CVT 1st trans. | CVT 2nd trans. | ICE 1st trans. | ICE 2nd trans. | EM 1st trans. | EM 2nd trans. |
|---|---|---|---|---|---|---|
| 1st clutch | closed | closed | closed | closed | open | open |
| 2nd clutch |  | not present |  |  |  |  |
| 3rd clutch | open | open | closed | closed | closed | closed |
| 4th clutch | closed | open | closed | open | closed | open |
| 5th clutch | open | closed | open | closed | open | closed |

In particular, the following transmission ratios are disclosed, which can apply if the first sun gear is connected to the internal combustion engine and the first ring gear is connected to the electric machine (that is to say the second drive torque is thus introduced into the first planetary transmission via the first ring gear):

1. Fixed-carrier transmission ratio in the first planetary transmission, corresponds to the ratio of rotational speed of first sun gear to rotational speed of first ring gear or to the diameter of first ring gear to diameter of first sun gear; negative sign, because resultant directions of rotation of first ring gear and first sun gear when the first planet carrier is stationary are opposite: −1.5 to −5; e.g., 2.0 to 3.0; preferably 2.1 to 2.3.
2. Step between the relatively low first transmission ratio and the relatively high second transmission ratio: 1 to 3; e.g., 1.5 to 2.5; preferably 2.
3. Preliminary transmission ratio for introduction of first drive torque of the internal combustion engine into the first planetary transmission, for example to the first sun gear: preferably 1 (no transmission ratio); and preliminary transmission ratio for introduction of second drive torque of the electric machine into the first planetary transmission, for example to the first ring gear: 0.5 to 2.5; e.g., 1.5 to 2.2; preferably 1.9.
4. Overall transmission ratio of the transmission arrangement; wherein
   a. as launch transmission ratio (wheel slip limit or launching on a kerb: between 9 and 23;
   b. as transmission ratio for the highest gear ratio (depending on demanded maximum speed and in order to achieve the lowest possible consumption: between 2 and 7.

5. Overall transmission ratio of the transmission arrangement:
   a. Drive by means of electric machine alone:
      i. 1st transmission ratio (1st gear ratio): between 9 and 23; e.g., 10 to 16;
      ii. 2nd transmission ratio (2nd gear ratio): between 3 and 12; e.g., 4 to 8;
   b. Drive by means of internal combustion engine alone:
      i. 1st transmission ratio (1st gear ratio): between 6 and 8; e.g., 6.5 to 7;
      ii. 2nd transmission ratio (2nd gear ratio): between 2 and 4; e.g., 3 and 3.5.

The statements made relating to the transmission arrangement likewise apply to the drive system and to the hybrid vehicle and vice versa.

By way of precaution, it is pointed out that the numerical words used here ("first", "second", "third", . . . ) serve primarily (only) for distinction between several similar objects, dimensions or processes, that is to say in particular do not imperatively predefine a dependency and/or sequence of said objects, dimensions or processes. If a dependency and/or sequence is necessary, this will be explicitly stated here, or will emerge in an obvious manner to a person skilled in the art from a study of the embodiment being specifically described.

SUMMARY OF THE DRAWINGS

The invention and the technical field will be discussed in more detail below on the basis of the figures. It is pointed out that the disclosed and/or claimed subject matter is not intended to be restricted by the exemplary embodiments shown. In particular, unless explicitly presented otherwise, it is also possible for partial aspects of the substantive matter discussed in the figures to be extracted and combined with other constituent parts and knowledge from the present description and/or figures. The same reference signs are used to denote identical objects, such that, where appropriate, explanations from other figures can be taken into consideration in a supplementary manner. In the figures, in each case schematically:

DESCRIPTION

Figure 1:
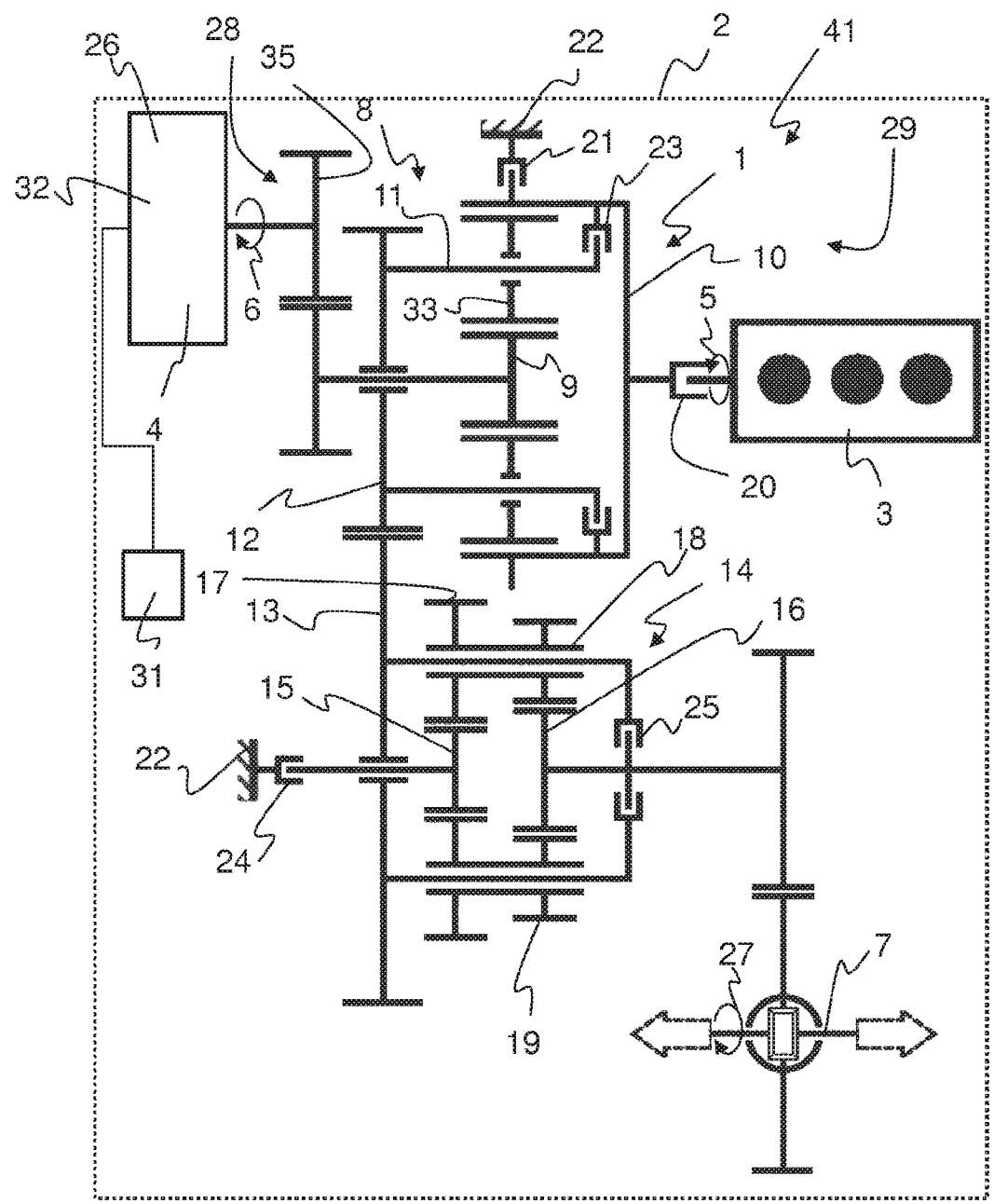
FIG. 1: shows a hybrid vehicle having a drive system and a transmission arrangement according to a first design variant in a simplified illustration.

FIG. 1 shows a hybrid vehicle 2 having a drive system 41 and a transmission arrangement 1 as per a first design variant in a simplified illustration. The hybrid vehicle 2 comprises an internal combustion engine 3 and an electric machine 4 and also a transmission arrangement 1, wherein the electric machine 4 is operable as a generator 26 for charging an accumulator 31 for electrical energy and as an electric motor 32 for driving a drive shaft 7 of the hybrid vehicle 2.

The transmission arrangement 1 is provided for transmitting a first drive torque 5 of the internal combustion engine 3 and a second drive torque 6 of the electric machine 4 to a drive shaft 7 of the hybrid vehicle 2, wherein the transmission arrangement 1 comprises a first planetary transmission 8 has first components that include a first sun gear 9, first ring gear 10 and first planet carrier 11. Via the first planet carrier 11, a third drive torque 12 is transmissible to a second planet carrier 13 of a second planetary transmission 14. The second planetary transmission 14 has second components that include a second planet carrier 13, second sun gear 15 and third sun gear 16, wherein the second sun gear 15 meshes with a first toothing 17 of a second planet gear 18 and the third sun gear 16 meshes with a second toothing 19 (which differs from the first toothing 17) of the second planet gear 18, wherein a drive shaft 7 of the hybrid vehicle 2 can be driven via the third sun gear 16.

The respective drive torques 5, 6, 12 are transmitted via intermeshing toothings of the individual toothed gears of the transmission arrangement 1. The third drive torque 12 corresponds to the first drive torque 5, to the second drive torque 6 or to a sum of first drive torque 5 and second drive torque 6. Here, the second drive torque 6 may also be negative, specifically if the electric machine 4 is operated as a generator 26 or in an opposite direction of rotation.

By means of the first planetary transmission 8, coupling of internal combustion engine 3 and electric machine 4 is made possible. It is thus possible for a first drive torque 5 of the internal combustion engine 3, a second drive torque 6 of the electric machine 4 or both drive torques 5, 6 together to be transmitted selectively to the second planetary transmission 14. Furthermore, a first drive torque 5 of the internal combustion engine 3 may at least partially be converted into electrical energy by the electric machine 4 operated as generator 26 and stored in an accumulator 31 of the hybrid vehicle 2. Furthermore, by means of the first planetary transmission 8, the internal combustion engine 3 can be operated at an optimum operating point with regard to consumption, wherein changes of the third drive torque 12, or of a rotational speed of the drive shaft 7, desired by a driver can be set by means of the electric machine 4.

A transmission ratio 38, 39 (see for example FIGS. 4 and 5) of the rotational speed predefined by the first planetary transmission 8 and of the transmitted third drive torque 12 is realized by means of the second planetary transmission 14. Here, a two gear ratio shift configuration is realized, that is to say it is possible for two different transmission ratios 38, 39 between the first planetary transmission 8 and the drive shaft 7 to be provided by means of the second planetary transmission 14.

The two planetary transmissions 8, 14 are constructed independently of one another, that is to say the third drive torque 12 is transmitted between the first planetary transmission 8 and second planetary transmission 14 via two components which have respectively intermeshing toothings, wherein the first component (in this case the first planet carrier 11) is assigned to the first planetary transmission 8 and the second component (in this case the second planet carrier 13) is assigned to the second planetary transmission 14.

The internal combustion engine 3 introduces the first drive torque 5 into the first planetary transmission 8 via the first ring gear 10. The electric machine 4 introduces the second drive torque 6 into the first planetary transmission 8 via the first sun gear 9. Here, further transmission ratios are arranged (so as to include the input pinion 35) between the first sun gear 9 and the electric machine 4.

The internal combustion engine 3 is connectable via a first clutch 20 to the first ring gear 10. The first clutch 20 is arranged outside a housing 22 of the transmission arrangement 1.

The first ring gear 10 is connectable rotationally conjointly by means of a second clutch 21 to a housing 22 of the transmission arrangement 1. Here, the first ring gear 10 is fixed to the (non-rotating) housing 22 of the transmission arrangement 1.

Furthermore, the first planet carrier 11 is connectable rotationally conjointly to the first ring gear 10 by means of a third clutch 23.

The second sun gear 15 is connectable rotationally conjointly to a housing 22 of the transmission arrangement 1 by means of a fourth clutch 24. Here, the second sun gear 15 is thus fixed to the (non-rotating) housing 22 of the transmission arrangement 1.

Furthermore, the third sun gear 16 (or the shaft that has the third sun gear 16) and the second planet carrier 13 are connectable rotationally conjointly to one another by means of a fifth clutch 25. The fourth clutch 24 and the fifth clutch 25 are actuated in order to set a desired transmission ratio 38, 39.

In the context of a recuperation, a fourth drive torque 27 can be utilized for charging the accumulator 31 by means of the electric machine 4 operated as generator 26.

Figure 2:
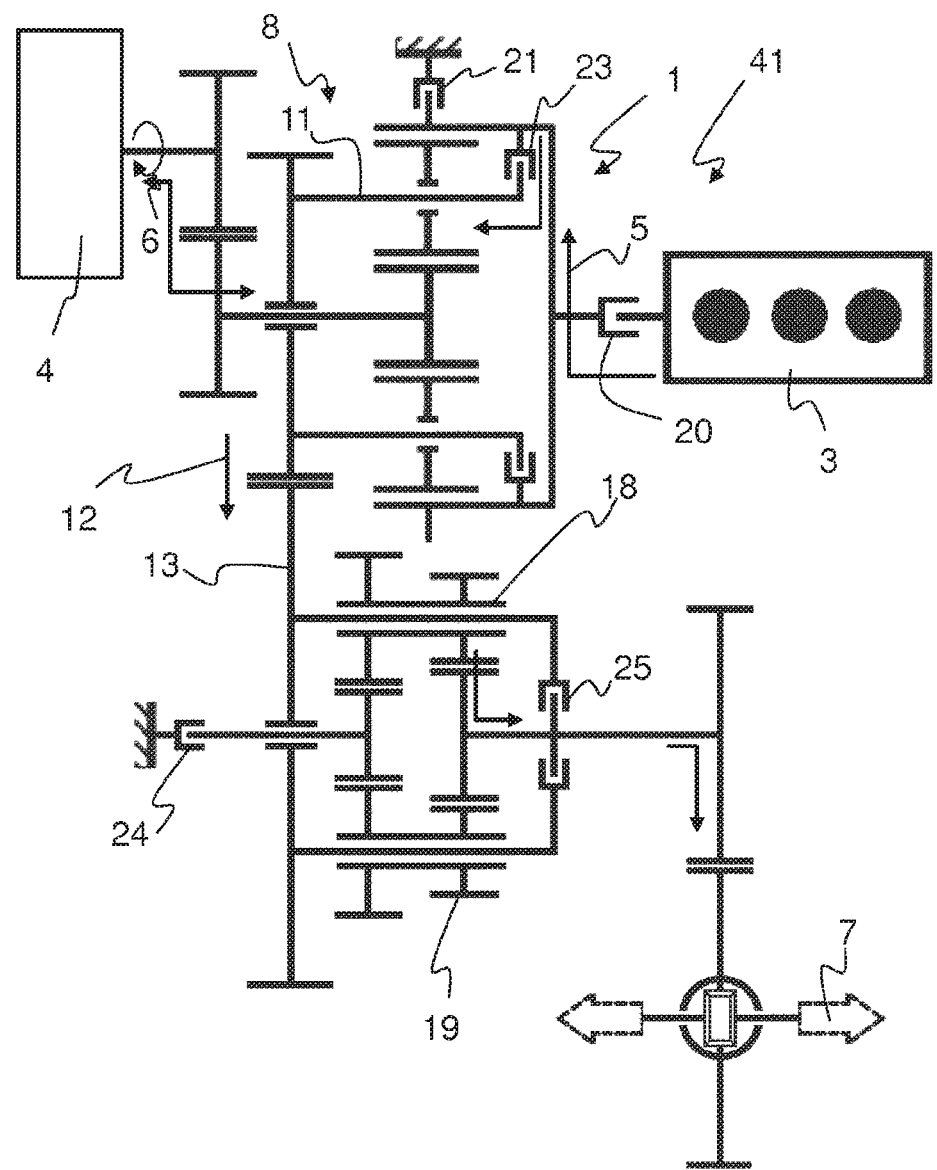
FIG. 2: shows the drive system having the transmission arrangement as per FIG. 1 in a simplified illustration, wherein the distribution of the drive torques in the CVT operating method in the case of the first transmission ratio being engaged is illustrated.

FIG. 2 shows the drive system 41 with the transmission arrangement 1 as per FIG. 1 in a simplified illustration, wherein the distribution of the drive torques 5, 6 in the CVT operating method in the case of the first transmission ratio 38 being engaged is illustrated. Reference is made to the statements made regarding FIG. 1.

Here, the first clutch 20 is closed, that is to say internal combustion engine 3 and first ring gear 10 are connected rotationally conjointly to one another. Furthermore, the second clutch 21 and the third clutch 23 are in the open shift state. A first drive torque 5 is provided by means of the internal combustion engine 3, and a second drive torque 6 is provided by means of the electric machine 4. The resulting third drive torque 12 is transmitted via the first planet carrier 11 to the second planet carrier 13.

For the first transmission ratio 38, the fourth clutch 24 is closed and the fifth clutch 25 is opened. In this case, the third drive torque 12 is transmitted via the second planet carrier 13, and the second planet gears 18 arranged on the second planet carrier 13, to the third sun gear 16, which meshes with a second toothing 19 of the second planet gears 18.

Figure 3:
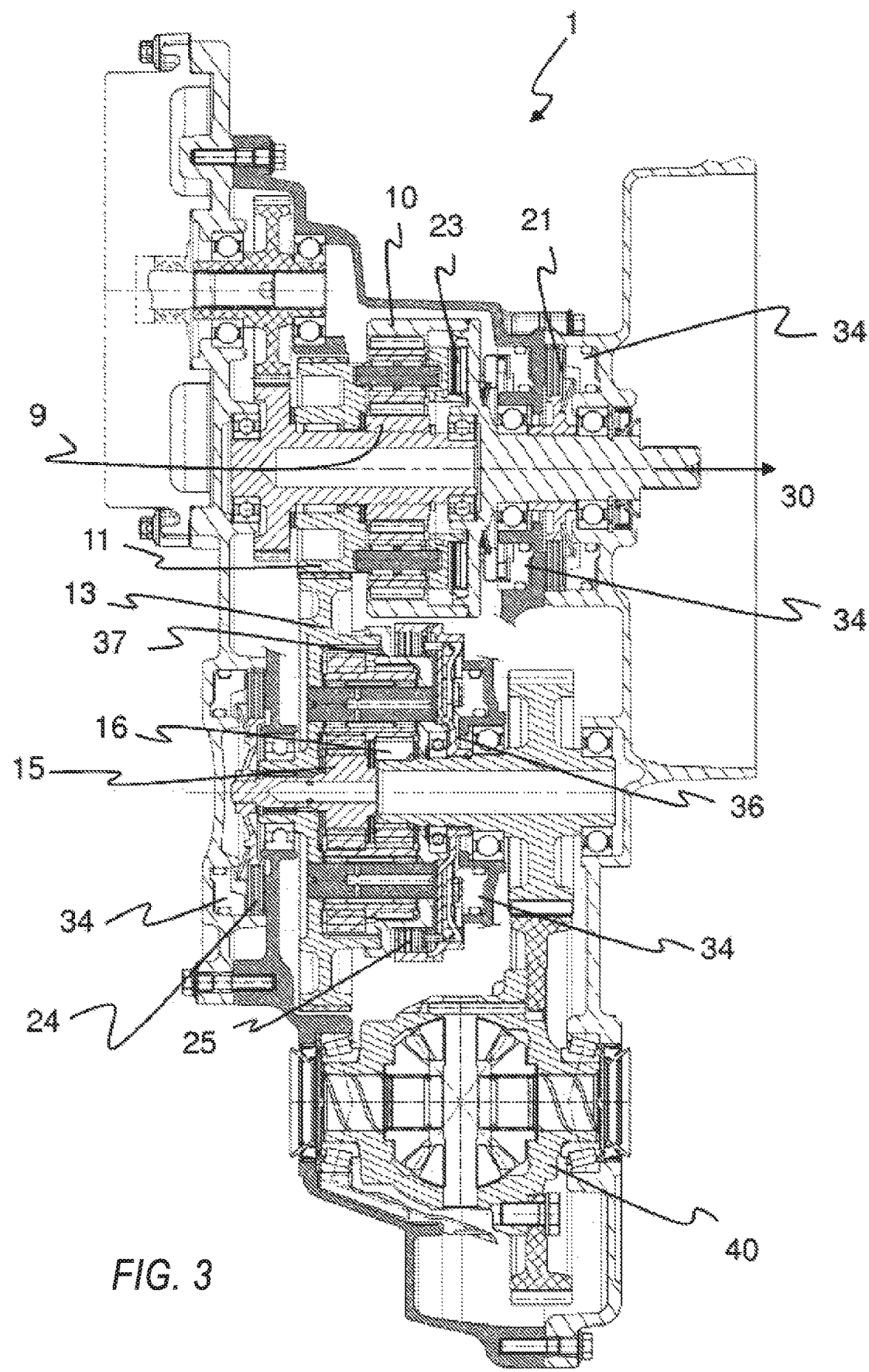
FIG. 3: shows the transmission arrangement as per FIGS. 1 and 2 in a side view in section.

FIG. 3 shows the transmission arrangement 1 as per FIGS. 1 and 2 in a side view in section. Reference is made to the statements made regarding FIG. 1. The first clutch 20 is not illustrated here. Here, the drive shafts 7 are connected to the third sun gear 16 via a differential 40. The individual clutches 21, 23, 24, 25 are each actuated hydraulically by means of actuators 34 (in this case ring-shaped pistons). The fifth clutch 25 is designed as a multiplate clutch, wherein the outer plate carrier 36 is connected rotationally conjointly to the third sun gear 16 (or to the shaft which has the third sun gear 16). The inner plate carrier 37 is connected rotationally conjointly to the second planet carrier 13.

Figure 4:
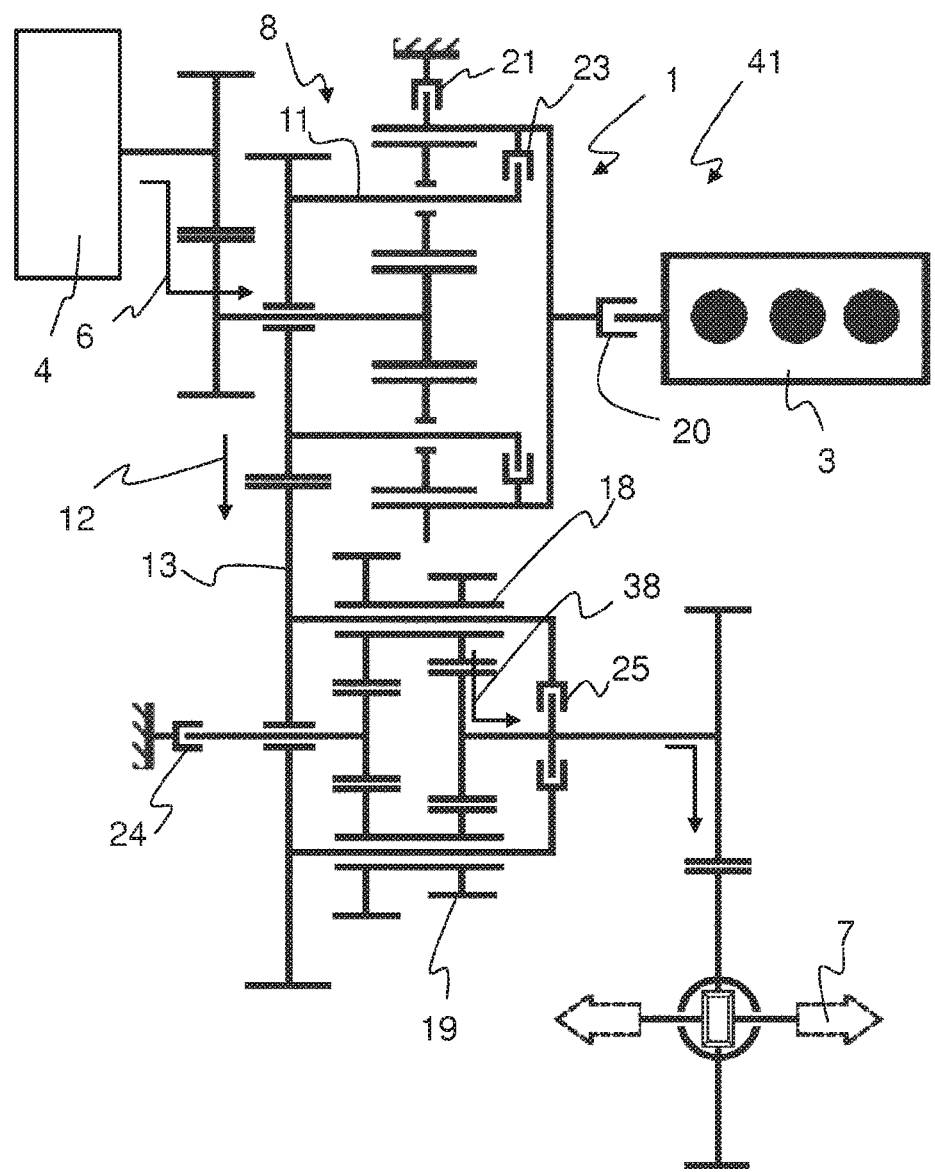
FIG. 4: shows the drive system with transmission arrangement as per FIGS. 1 to 3 in a simplified illustration, wherein the distribution of the drive torques in the EM operating method in the case of the first transmission ratio being engaged is illustrated.

FIG. 4 shows the drive system with the transmission arrangement 1 as per FIGS. 1 to 3 in a simplified illustration, wherein the distribution of the drive torques 6, 12 in the EM operating method in the case of the first transmission ratio 38 being engaged is illustrated. Reference is made to the statements made regarding FIGS. 1 and 2.

By contrast to FIG. 2, the first clutch 20 and the third clutch 23 are in this case in the open shift state. The internal combustion engine 3 is thus decoupled. The second clutch 21 is in the closed shift state, that is to say the first ring gear 10 is connected rotationally conjointly to the housing 22. The second drive torque 6 of the electric machine 4 is thus transmitted to the first planet carrier 11 via the first sun gear 9 of the first planetary transmission 8 and via the toothings, which mesh with the first sun gear 9, of the first planet gears 33, which are arranged on the first planet carrier 11. Via the first planet carrier 11, the second drive torque 6 is transmitted to the second planet carrier 13 of the second planetary transmission 14.

Furthermore, to generate the first transmission ratio, the fourth clutch 24 is closed and the fifth clutch 25 is open. In this case, the third drive torque 12 is transmitted via the second planet carrier 13, and the second planet gears 18 arranged on the second planet carrier 13, to the third sun gear 16, which meshes with a second toothing 19 of the second planet gears 18.

Figure 5:
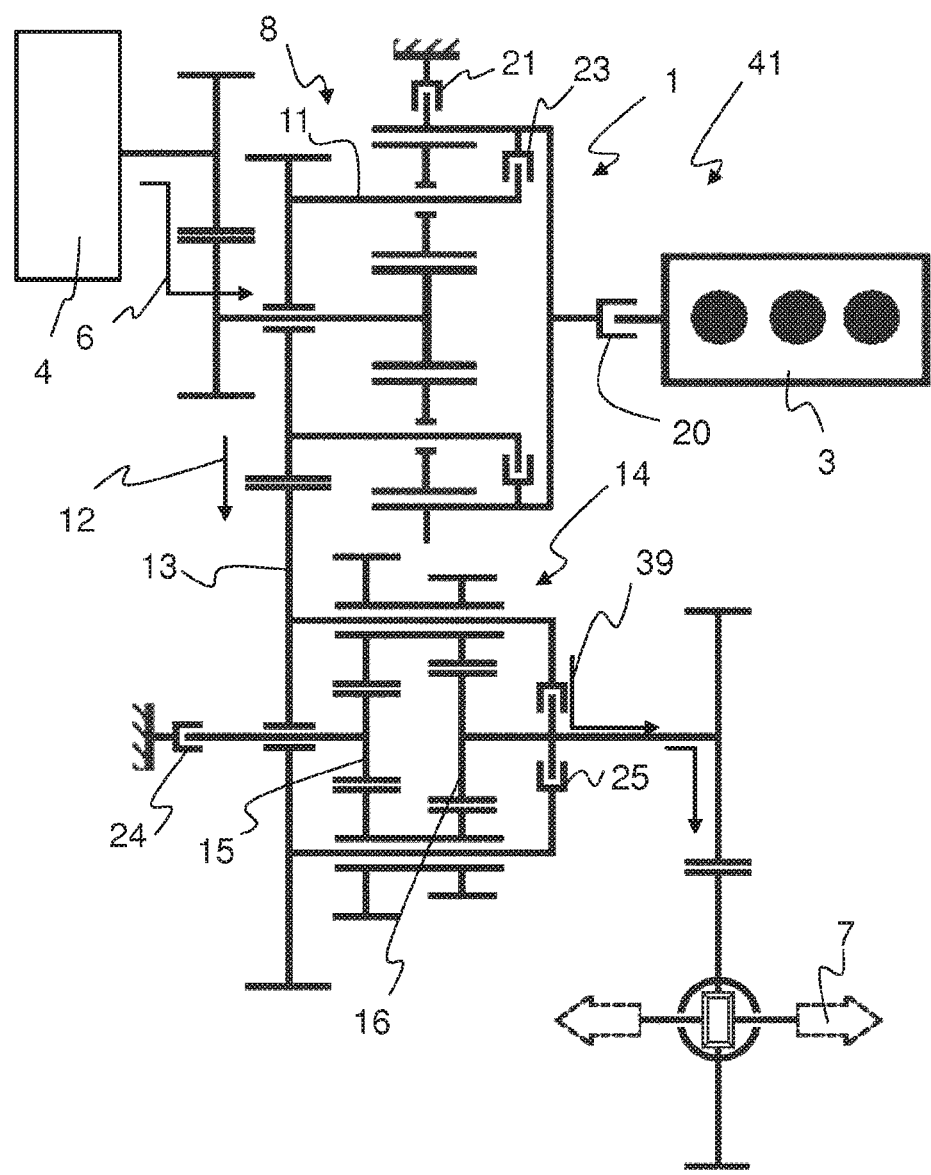
FIG. 5: shows the drive system with transmission arrangement as per FIGS. 1 to 4 in a simplified illustration, wherein the distribution of the drive torques in the EM operating method in the case of the second transmission ratio being engaged is illustrated.

FIG. 5 shows the drive system 41 with the transmission arrangement 1 as per FIGS. 1 to 4 in a simplified illustration, wherein the distribution of the drive torques 6, 12 in the EM operating method in the case of the second transmission ratio 39 being engaged is illustrated.

Reference is made to the statements made regarding FIG. 4. Here, by contrast to FIG. 4, a second transmission ratio 39 is engaged. For the second transmission ratio 39, the fourth clutch 24 is opened and the fifth clutch 25 is closed. In this case, the third drive torque 12 is transmitted via the second planet carrier 13 (directly) to the third sun gear 16 (or to the shaft which has the third sun gear 16).

Figure 6:
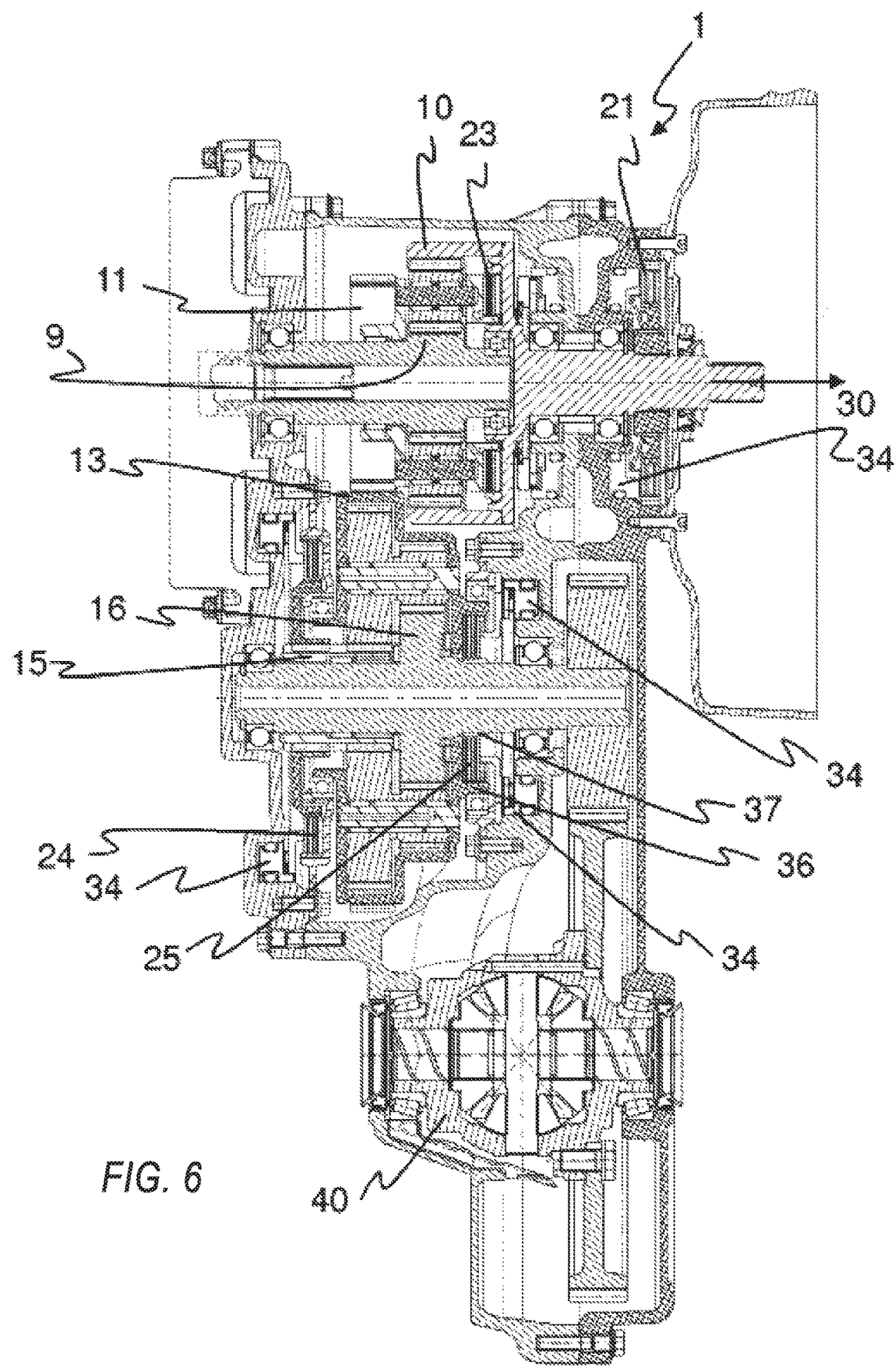
FIG. 6: shows a transmission arrangement as per a second design variant in a side view in section.
Figure 7:
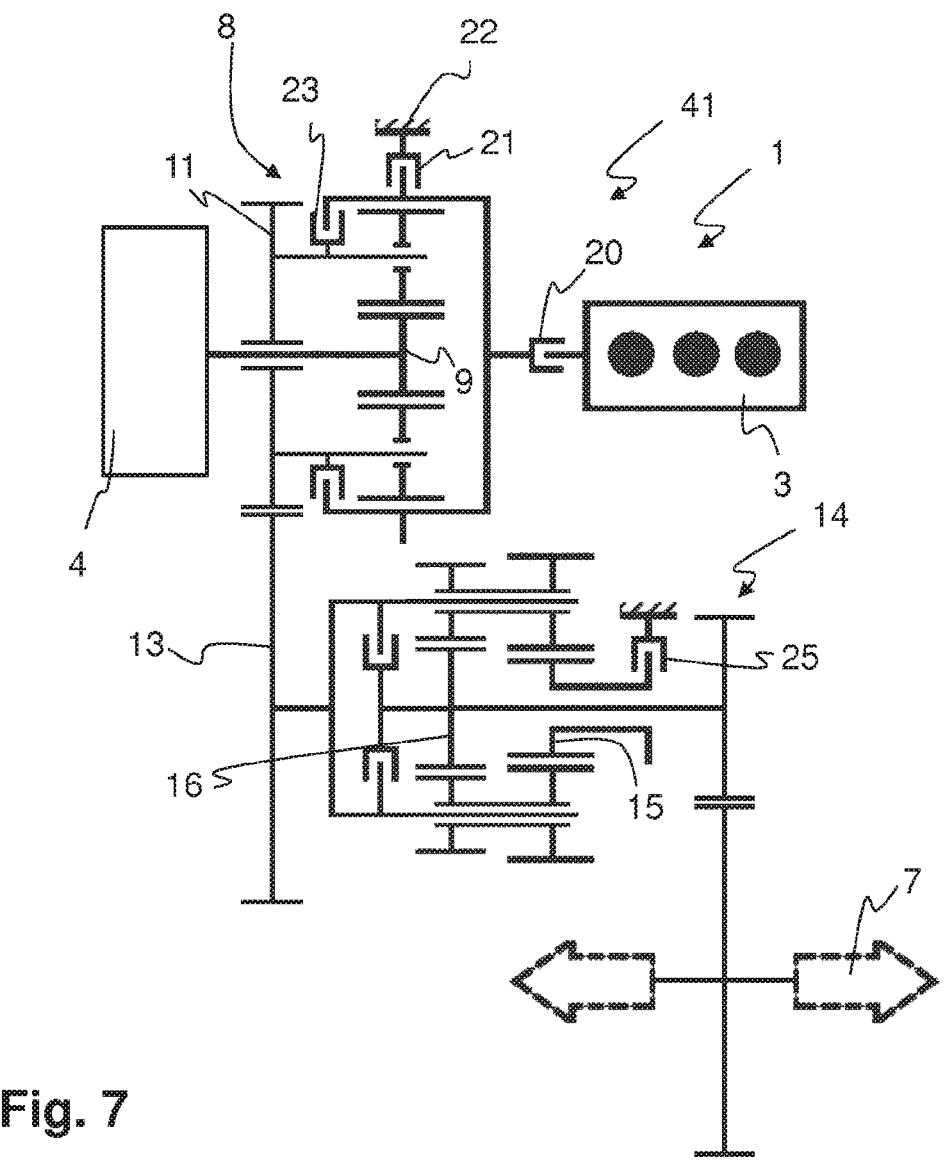
FIG. 7: shows the drive system with transmission arrangement as per FIG. 6 in a simplified illustration.

FIG. 6 shows the transmission arrangement 1 as per a second design variant in a side view in section. FIG. 7 shows the drive system 41 with the transmission arrangement 1 as per FIG. 6 in a simplified illustration. FIGS. 6 and 7 will be described jointly below. In this regard, reference is made to the statements made regarding FIGS. 1 to 3.

The first clutch 20 is not illustrated here. By contrast to the first design variant (see FIGS. 1 and 3), no transmission ratio is arranged between the first sun gear 9 and the electric machine 4. Here, internal combustion engine 3 and electric machine 4 are arranged coaxially with respect to one another.

The internal combustion engine 3 introduces the first drive torque 5 into the first planetary transmission 8 via the first ring gear 10. The electric machine 4 introduces the second drive torque 6 into the first planetary transmission 8 via the first sun gear 9.

The two planetary transmissions 8, 14 are constructed independently of one another, that is to say the third drive torque 12 is transmitted between the first planetary transmission 8 and second planetary transmission 14 via two components which have respectively intermeshing toothings, wherein the first component (in this case the first planet carrier 11) is assigned to the first planetary transmission 8 and the second component (in this case the second planet carrier 13) is assigned to the second planetary transmission 14.

The second sun gear 15 is connectable rotationally conjointly by means of a fourth clutch 24 to a housing 22 of the transmission arrangement 1. Here, the second sun gear 15 is thus fixed to the (non-rotating) housing 22 of the transmission arrangement 1.

Furthermore, the third sun gear 16 (or the shaft that has the third sun gear 16) and the second planet carrier 13 are connectable rotationally conjointly to one another by means of a fifth clutch 25. The fourth clutch 24 and the fifth clutch 25 are actuated in order to set a desired transmission ratio 38, 39.

Here, the drive shafts 7 are connected to the third sun gear 16 via a differential 40. The individual clutches 21, 23, 24, 25 are each actuated hydraulically by means of actuators 34 (in this case ring-shaped pistons). The fifth clutch 25 is designed as a multiplate clutch, wherein—as a further difference in relation to FIG. 3—in this case the inner plate carrier 37 is connected rotationally conjointly to the third sun gear 16 (or to the shaft which has the third sun gear 16). The outer plate carrier 36 is connected rotationally conjointly to the second planet carrier 13.

Figure 8:
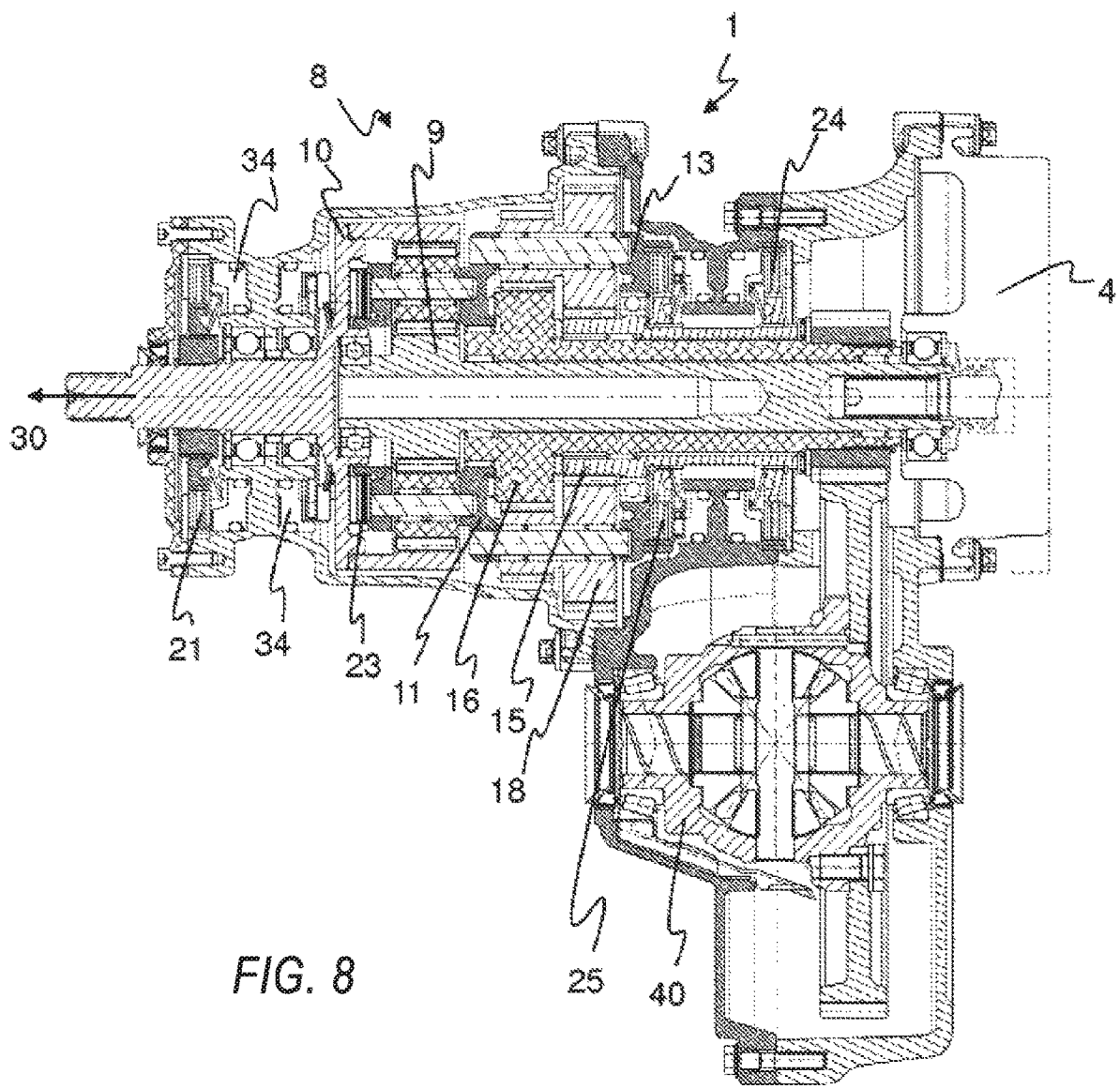
FIG. 8: shows a transmission arrangement as per a third design variant in a side view in section.
Figure 9:
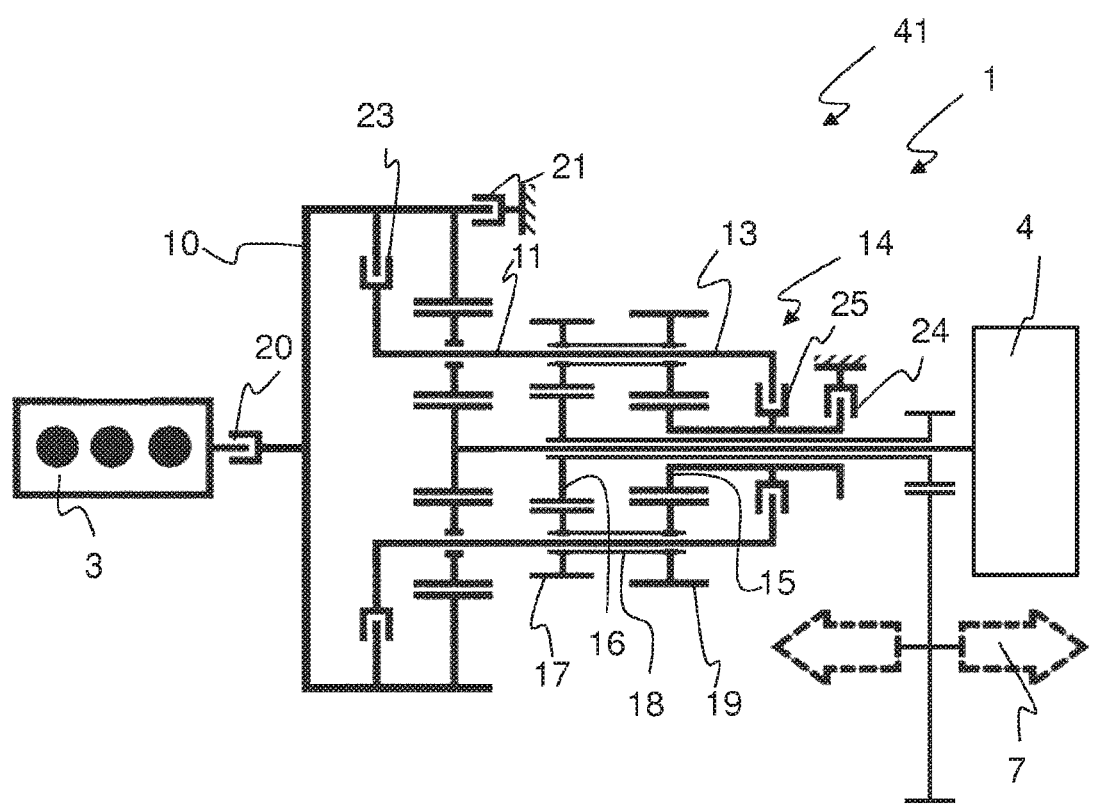
FIG. 9: shows the drive system with transmission arrangement as per FIG. 8 in a simplified illustration.

FIG. 8 shows a transmission arrangement 1 as per a third design variant in a side view in section. FIG. 9 shows the drive system 41 with the transmission arrangement 1 as per FIG. 8 in a simplified illustration. FIGS. 8 and 9 will be described jointly below. In this regard, reference is made to the statements made regarding FIGS. 1 to 3.

The first clutch 20 is not illustrated here. By contrast to the first design variant (see FIGS. 1 and 3), no transmission ratio is arranged between the first sun gear 9 and the electric machine 4. Internal combustion engine 3 and electric machine 4 are arranged coaxially with respect to one another.

The internal combustion engine 3 introduces the first drive torque 5 into the first planetary transmission 8 via the first ring gear 10. The electric machine 4 introduces the second drive torque 6 into the first planetary transmission 8 via the first sun gear 9.

The two planetary transmissions 8, 14 are rigidly connected to one another, that is to say the third drive torque 12 is transmitted between the first planetary transmission 8 and second planetary transmission 14 via a common planet carrier 11, 13.

Thus, by means of the common planet carrier 11, 13, the two planetary transmissions 8, 14 are arranged coaxially with respect to one another, that is to say the first planet carrier 11 is arranged coaxially with respect to the second planet carrier 13.

The second sun gear 15 is connectable rotationally conjointly by means of a fourth clutch 24 to a housing 22 of the transmission arrangement 1. Here, the second sun gear 15 is fixed to the (non-rotating) housing 22 of the transmission arrangement 1.

By contrast to the first and second design variants, in this case the second sun gear 15 (or the shaft which has the second sun gear 15) and the second planet carrier 13 are connectable rotationally conjointly to one another by means of a fifth clutch 25. The fourth clutch 24 and the fifth clutch 25 are actuated in order to set a desired transmission ratio 38, 39.

Here, the drive shafts 7 are connected to the third sun gear 16 via a differential 40. The individual clutches 21, 23, 24, 25 are each actuated hydraulically by means of actuators 34 (in this case ring-shaped pistons). The fifth clutch 25 is designed as a multiplate clutch, wherein—by contrast to FIG. 3—in this case the inner plate carrier 37 is connected rotationally conjointly to the second sun gear 16 (or to the shaft which has the second sun gear 15). The outer plate carrier 36 is connected rotationally conjointly to the second planet carrier 13.

Figure 10:
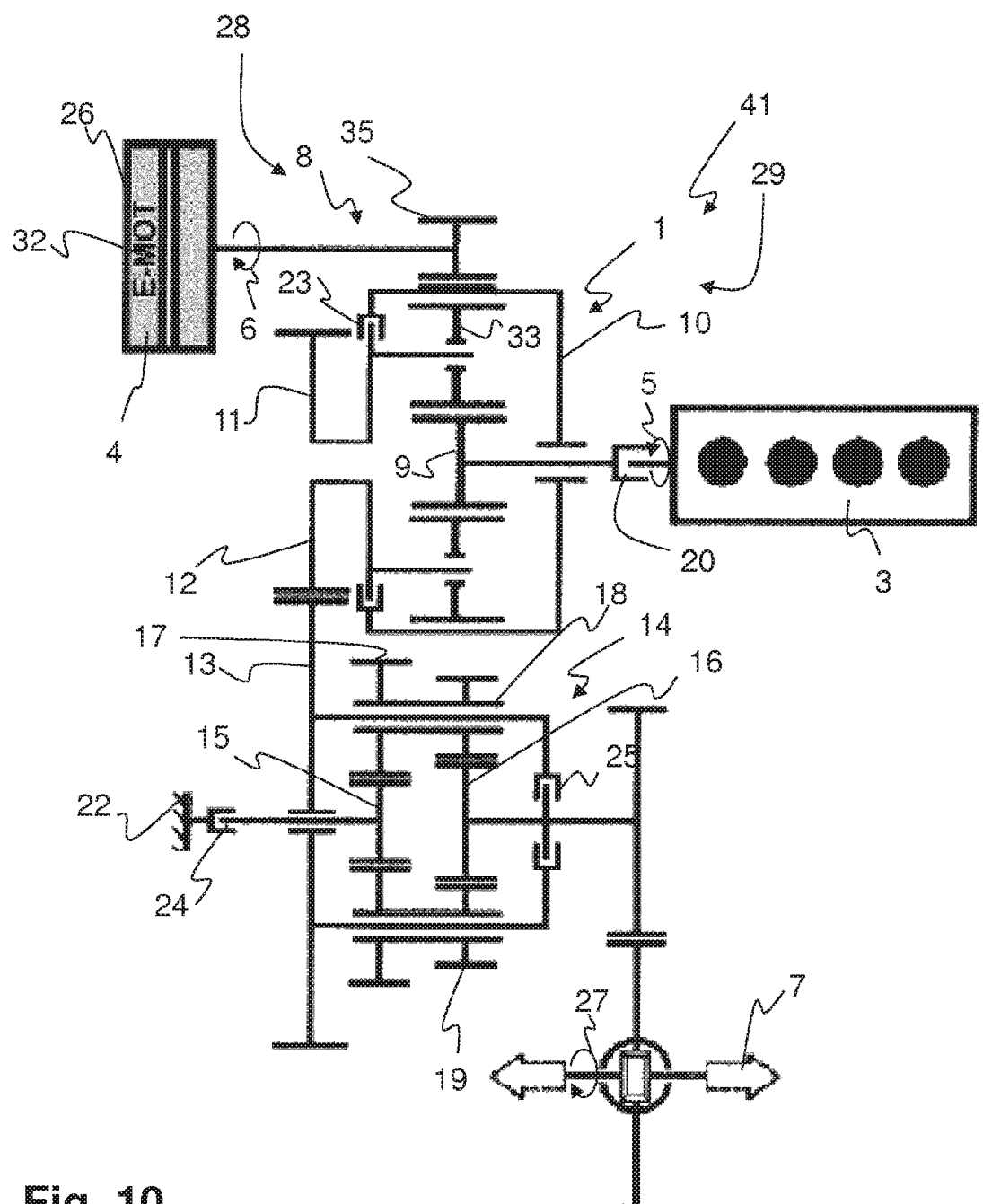
FIG. 10: shows the drive system with transmission arrangement as per a fourth design variant in a simplified illustration.

FIG. 10 shows a drive system 41 with transmission arrangement 1 as per a fourth design variant in a simplified illustration. Reference is additionally also made to the statements made regarding FIG. 1. By contrast to the design variants as per FIGS. 1 to 9, in this case the first drive torque 5 of the internal combustion engine 3 is introduced into the first planetary transmission 8 via the first sun gear 9. The second drive torque 6 of the electric machine 4 is introduced into the first planetary transmission 8 via the first ring gear 10. In this design variant, a second clutch 21 is not provided. A first drive torque 5 is provided by means of the internal combustion engine 3 and a second drive torque 6 is provided by means of the electric machine 4. The resulting third drive torque 12 is transmitted to the second planet carrier 13 via the first planet carrier 11.

For purely electric motor operation (EM), the first clutch 20 is opened and the third clutch 23 is closed. The function of the second clutch 21 required in the other embodiments is not required here.

LIST OF REFERENCE NUMBERS

1 Transmission arrangement
2 Hybrid vehicle
3 Internal combustion engine
4 Electric machine
5 First drive torque
6 Second drive torque
7 Drive shaft
8 First planetary transmission
9 First sun gear
10 First ring gear
11 First planet carrier
12 Third drive torque
13 Second planet carrier
14 Second planetary transmission
15 Second sun gear
16 Third sun gear
17 First toothing
18 Second planet gear
19 Second toothing
20 First clutch
21 Second clutch
22 Housing
23 Third clutch
24 Fourth clutch
25 Fifth clutch
26 Generator
27 Fourth drive torque
28 First side
29 Second side
30 Axial direction
31 Accumulator
32 Electric motor
33 First planet gear
34 Actuator
35 Input pinion 36 Outer plate carrier
37 Inner plate carrier
38 First transmission ratio
39 Second transmission ratio
40 Differential
41 Drive system

The invention claimed is:

1. A system, comprising a transmission arrangement for a hybrid vehicle having an internal combustion engine and an electric machine, wherein a first drive torque of the internal combustion engine and a second drive torque of the electric machine are transmissible to at least one drive shaft of the hybrid vehicle by the transmission arrangement, the transmission arrangement comprising:
   a first planetary transmission having first components that include a first sun gear, first ring gear, and first planet carrier, wherein the internal combustion engine is selectively connectable to one of the first ring gear or the first sun gear and the electric machine is selectively connectable to the other of the first ring gear or the first sun gear;
   wherein:
   a third drive torque is transmissible to a second planet carrier of a second planetary transmission by means of the first planet carrier;
   the second planetary transmission has second components that include a second planet carrier, second sun gear, and third sun gear;
   the second sun gear meshes with a first toothing of a second planet gear and the third sun gear meshes with a second toothing of the second planet gear; and
   the drive shaft of the hybrid vehicle is driveable by the third sun gear.

2. The system of claim 1, wherein the internal combustion engine is connectable to the first ring gear by a first clutch.

3. The system of claim 1, wherein at least two of the first sun gear, first ring gear, or first planet carrier are connectable rotationally conjointly to one another by a third clutch.

4. The system of claim 1, wherein the second sun gear is connectable rotationally conjointly to a housing of the transmission arrangement by a fourth clutch.

5. The system of claim 1, wherein at least two of the second planet carrier, second sun gear, or third sun gear are connectable rotationally conjointly to one another by a fifth clutch.

6. The system of claim 1, wherein the third sun gear is driveable by the third drive torque, wherein the third drive torque is
   a. the first drive torque when the internal combustion engine alone is connected to the first planetary transmission; or
   b. the second drive torque when the electric machine alone is connected to the first planetary transmission; or
   c. the sum of the first drive torque and the second drive torque when both the internal combustion engine and electric machine are connected to the first planetary transmission.

7. The system of claim 1, wherein the first planetary transmission and the second planetary transmission are arranged
   a. adjacent to one another; or
   b. one behind the other along an axial direction; or
   c. one behind the other along an axial direction with a coaxial arrangement of first planet carrier and second planet carrier.

8. The system of claim 1, wherein the first ring gear is connectable rotationally conjointly by a second clutch to a housing of the transmission arrangement.

9. The system of claim 1, further comprising a drive system that includes the internal combustion engine, the electric machine and the transmission arrangement.

10. The system of claim 9, wherein the internal combustion engine is arranged to introduce the first drive torque into the first planetary transmission via the first ring gear.

11. The system of claim 9, wherein the electric machine is arranged to introduce the second drive torque into the first planetary transmission via the first sun gear.

12. The system of claim 9, wherein the internal combustion engine is arranged to introduce the first drive torque into the first planetary transmission via the first sun gear, and wherein the electric machine is arranged to introduce the second drive torque into the first planetary transmission via the first ring gear.

13. The system of claim 12, wherein the internal combustion engine is connectable to the first ring gear by a first clutch, and at least two components of the first sun gear, first ring gear, and first planet carrier are connectable rotationally conjointly to one another by a third clutch; wherein components of the first planetary transmission are connectable to further components of the drive system exclusively by the first clutch and the third clutch.

14. The system of claim 9, wherein the electric machine is operable as a generator, wherein a first drive torque of the internal combustion engine or a fourth drive torque of the drive shaft is convertible into electrical energy by the generator.

15. The system of claim 9, wherein the electric machine is arranged at a first side and the internal combustion engine is arranged at an opposite, second side of the transmission arrangement.

16. The system of claim 9, further comprising the hybrid vehicle, wherein the electric machine is operable as a generator for charging an accumulator for electrical energy and as an electric motor for driving a drive shaft of the hybrid vehicle.

* * * * *